US012654370B2

(12) United States Patent
Mühlemann

(10) Patent No.: US 12,654,370 B2
(45) Date of Patent: Jun. 16, 2026

(54) METHOD AND INJECTION MOULD FOR PRODUCING A PRODUCT FROM AN INSERT AND PLASTIC BODY INJECTION-MOULDED THEREON

(71) Applicant: FOSTAG Formenbau AG, Stein am Rhein (CH)

(72) Inventor: Rolf Mühlemann, Schlattingen (CH)

(73) Assignee: FOSTAG Formenbau AG, Stein am Rhein (CH)

( * ) Notice: Subject to any disclaimer, the term of this patent is extended or adjusted under 35 U.S.C. 154(b) by 99 days.

(21) Appl. No.: 18/725,935

(22) PCT Filed: Nov. 29, 2022

(86) PCT No.: PCT/CH2022/050033
§ 371 (c)(1),
(2) Date: Jul. 1, 2024

(87) PCT Pub. No.: WO2023/130192
PCT Pub. Date: Jul. 13, 2023

(65) Prior Publication Data
US 2025/0114989 A1 Apr. 10, 2025

(30) Foreign Application Priority Data

Jan. 6, 2022 (CH) ...................................... 27/2022

(51) Int. Cl.
*B29C 45/14* (2006.01)
*B29C 45/27* (2006.01)
*B29L 31/00* (2006.01)
(52) U.S. Cl.
CPC .... *B29C 45/14336* (2013.01); *B29C 45/2708* (2013.01); *B29L 2031/7138* (2013.01)
(58) Field of Classification Search
CPC .............. B29C 2045/14122; B29C 2045/2691
See application file for complete search history.

(56) References Cited

U.S. PATENT DOCUMENTS 3,787,547 A 1/1974 Stephan
5,226,586 A 7/1993 Grone
(Continued)

FOREIGN PATENT DOCUMENTS

EP 0453754 A2 10/1991
EP 0712709 A1 5/1996
(Continued)

OTHER PUBLICATIONS

International Search Report and Written Opinion for PCT/CH2022/050033, filed Nov. 29, 2022.
(Continued)

*Primary Examiner* — Virak Nguon
(74) *Attorney, Agent, or Firm* — Fleit Intellectual Property Law; Paul D. Bianco

(57) ABSTRACT

A method for producing a product comprising a cup-shaped insert with a circumferential edge and a circumferential plastic body which is injection-molded onto the edge. The method includes: inserting the insert into a first mold of an injection molding tool; injecting a plastic melt into a first circumferential cavity formed by the first mold and the insert to produce a first circumferential plastic body part having a web which forms a recess; inserting the insert into a second mold of an injection molding tool, with the second mold designed such that a second circumferential cavity is formed on the edge region to be injection-molded to produce a second circumferential plastic body part; injecting a plastic melt into the second mold so that the plastic melt flows through the recess, fills the second cavity, and forms the second plastic body part; and removing the product from the mold.

10 Claims, 2 Drawing Sheets

(56)     References Cited

U.S. PATENT DOCUMENTS

| | | | |
|---|---|---|---|
| 2009/0250372 A1 | 10/2009 | Wnek | |
| 2011/0227250 A1* | 9/2011 | Wnek .................. | B65D 5/4279 |
| | | | 425/542 |
| 2016/0167268 A1* | 6/2016 | Mühlemann ........ | B29C 45/2602 |
| | | | 425/129.1 |
| 2017/0001351 A1 | 1/2017 | Nakamura | |
| 2019/0111599 A1 | 4/2019 | Matsuo | |
| 2025/0100194 A1 | 3/2025 | Mühlemann | |

FOREIGN PATENT DOCUMENTS

| | | | |
|---|---|---|---|
| EP | 2821203 A1 | 1/2015 |
| EP | 3120987 A1 | 1/2017 |
| EP | 3421215 A1 | 1/2019 |
| FR | 2175094 A1 | 10/1973 |
| JP | S56 29618 A | 2/1983 |
| WO | 2015/000797 A1 | 1/2015 |

OTHER PUBLICATIONS

Restriction Requirement dated Dec. 9, 2025 for U.S. Appl. No. 18/725,962.

* cited by examiner

METHOD AND INJECTION MOULD FOR PRODUCING A PRODUCT FROM AN INSERT AND PLASTIC BODY INJECTION-MOULDED THEREON

FIELD OF THE INVENTION

The invention relates to a method and an injection mould for producing a product comprising an insert having an edge which is to be reinforced and a plastic body which is injection-moulded onto the edge, wherein the plastic body surrounds an edge region of the insert on both sides and at the end face.

BACKGROUND

Particularly in the case of containers and packing materials, there is a need to provide flat flexible parts along one edge with a plastic body which has a higher strength than the flat material.

For the most part in this case, the individual parts are manufactured separately and subsequently mechanically joined and possibly adhesively bonded to one another (e.g. FR2175094 or EP0453754).

A more efficient method is known from WO2015000797 for injection moulding a collar made from plastic directly onto a peripheral edge of an insert. To this end, the insert is inserted into a receptacle cavity of an injection mould. The edge region of the insert, which is to be overmoulded, is fixed in the injection mould by means of stationary and movable mould parts. The receptacle cavity in this case only extends over a few sub-regions on an underside of the edge region. In a first step, radially outwardly directed plastic ribs are moulded on the underside of the edge region. In a second step, mould parts, between which the plastic ribs had been formed, are lowered and a peripheral collar is formed on the underside of the edge region in a second injection. Then, a movable cavity-forming mould part on the upper side of the edge region is moved away and the exposed cavity is filled to form the peripheral collar on the upper side in a third injection.

The main problem when overmoulding the edge region lies in the materials to be overmoulded often not being dimensionally stable or not withstanding the pressure arising during the injection process and being pushed away in an uncontrolled manner by the melt. For this reason, the method from WO2015000797 is based on an injection mould, which is built in a complicated manner, having a multiplicity of mould parts which can be moved independently of one another and form cavities. These mould parts fix the edge region in a first step and gradually expose sub-regions of a cavity until the edge of the insert is completely overmoulded, i.e. at the end of the injection moulding process, the edge region is enclosed by the plastic body on both sides and over the end face.

SUMMARY OF THE INVENTION

One object of the invention is to specify a method for producing a product made up of insert and plastic body injection-moulded thereon, which solves the problems of the prior art and ensures a reliable, strong connection between an insert and a plastic body that is injection-moulded thereon.

The method for producing a product comprising a cup-shaped insert having a peripheral edge which is to be reinforced and a peripheral plastic body which is injection-moulded onto the edge, the plastic body surrounding an edge region of the cup-shaped insert on both sides and at the end face, has the following steps: (a) providing a first mould part of an injection mould; (b) inserting the cup-shaped insert into the first mould part, the first mould part and the insert being designed in such a manner that a first peripheral cavity is formed on the inner side and at the end face at the edge region which is to be overmoulded and the outer side of the edge region of the insert bears against a wall of the first cavity; (c) injecting a first polymer melt into the first peripheral cavity to manufacture a first peripheral plastic body part, the peripheral cavity having a rib which forms a recess in the first peripheral plastic body part at the end face of the edge region of the insert; (d) providing a second mould part of an injection mould; (e) inserting the cup-shaped insert having the first peripheral plastic body part into the second mould part, the second mould part being designed in such a manner that a second peripheral cavity for manufacturing a second peripheral plastic body part is formed on the outer side on the edge region to be overmoulded and that the recess in the first peripheral plastic body part is connected to the second peripheral cavity; (f) injecting a second polymer melt into the second mould part so that the second polymer melt flows through the recess of the first plastic body part, fills the second cavity and thus forms the second plastic body part; (g) removing the product having a peripheral plastic body consisting of the first and the second plastic body parts from the mould.

Using the method, the plastic body is accordingly produced using a two-component injection moulding method in that a first peripheral plastic body part is injected first and a second peripheral plastic body part is injected subsequently. The two parts are strongly connected to one another in the region of the end face of the edge region of the insert and thus form the peripheral plastic body.

The advantage of the method lies in a passage being created in the first peripheral plastic body part by means of the rib, through which passage the second polymer melt reaches the second cavity. In this manner, the injection points or the injection moulding nozzles can be arranged on the same side of the cup-shaped product-namely on the side facing away from the base. This is particularly advantageous, because there is barely any space available for the injection moulding nozzles on the side facing the base.

One mould part usually has a female mould and a core which together form the cavity of an injection mould. A cup-shaped insert typically has a base and a peripheral side wall. "On the inner side" means the inner side of the cup-shaped insert. If the cup-shaped insert has an outwardly directed flange (i.e. an outwardly directed edge similar to a flange) at the upper open edge, e.g. for fastening a covering film and/or for forming sealing means, then "on the inner side" also means the upper side of the flange, which faces away from the base of the cup-shaped insert. The term "at the end face" in each case means the end face of the edge or the flange. The term "on the outer side" relates to the outer side of the cup-shaped insert. If a flange is present, then this also means the lower side of the flange, which faces the base.

The edge to be reinforced means a region of the insert which is narrow and extends over a certain length (e.g. an elongated edge of an insert). The edge region has two mutually opposite side surfaces and an end face. An edge region of this type often has insufficient stability and it is desirable to reinforce this in order for example to give the finished product more stability or other functions (e.g. fastening regions for further parts, such as lids, etc.). The edge region may for example be an upper peripheral edge of a cup or a capsule body of a coffee capsule.

The method is suitable for inserts which have a flexible edge region, for which there is the risk that the edge region is pushed away by the polymer melt and thus cannot undergo a strong and permanent connection to the plastic body. Accordingly, the insert may be designed to be thin-walled and/or flat.

Plastic means all materials capable of being injection moulded. These include conventional plastics capable of being injection moulded, but also novel materials capable of being injection moulded, which are made from natural substances and which will possibly no longer be designated as plastic in the future.

In a few embodiments, the first and second mould parts or the first and second cavities can in each case have at least one injection point for the first or second polymer melt. The rib can be arranged in a region in which two flow fronts of the first polymer melt meet. If, for example, a single injection point is present, then the rib is preferably located on the opposite side of the peripheral cavity, specifically in the region in which the flow fronts of the first polymer melt meet. If a plurality of injection points are present, then the cavity can preferably also have a plurality of ribs. The plurality of injection points can be arranged uniformly along the first cavity and the plurality of ribs can in each case be arranged centrally between two injection points. Here also, the ribs are located in the region in which the flow fronts of the first polymer melt meet.

In a few embodiments, the insert having the first plastic body part can be inserted into the second mould part in such a manner that the recess is located at the injection point for the second polymer melt. This recess thus forms a part of the second cavity, into which the second polymer melt is injected. The recess makes it possible to arrange the injection moulding nozzle for the second polymer melt on the same side as the injection moulding nozzle for the first polymer melt.

In a few embodiments, the injection point for the first polymer melt and the injection point for the second polymer melt can be located on the same side of the respective mould part.

The product can be a container having a container body or a container wall and a collar running around a container opening, wherein the container body or the container wall is formed by the insert and the container collar is formed by the plastic body. The peripheral collar can have an outwardly directed edge similar to a flange, an external thread or latching means for a container lid. The container lid can accordingly be a sealing film, a screw lid or a container lid with opposing latching means.

The insert can have a circular, oval or rectangular peripheral edge. A rectangular peripheral edge generally has rounded corners. The insert can also have an outwardly directed edge (flange) similar to a flange, which is overmoulded with the plastic body.

The insert can have a flexible, non-dimensionally-stable and/or thin-walled or flat edge region. It can be manufactured from paper, cardboard, a textile fabric, metal, plastic or laminates made from such materials. A few of the materials can be biologically degradable or compostable (industrially and in domestic compost). The thickness of the edge region can be 0.1 to 2 mm. The edge region can be a peripheral edge region, e.g. the edge of a cup-shaped container. The edge region of the insert can have a rough surface or a coating so that the plastic injection-moulded thereon can form a strong connection to the insert. The edge region can additionally also be provided with recesses or openings.

The plastic body that is injection-moulded thereon can be configured on the basis of the shape or the material such that it is stronger or more dimensionally stable than the edge region of the insert and forms a reinforcing plastic element. The plastic used can also be biologically degradable or compostable (industrially and in domestic compost) materials capable of being injection moulded. Generally in the present case, plastic means all known and future materials capable of being injection moulded.

The method can for example be used for producing a container comprising a container body which has an upper peripheral edge for forming an opening and a peripheral collar made from plastic which encloses the upper edge. The container body can in this case have a lower rigidity than the peripheral collar.

The invention further relates to an injection mould for carrying out the method for producing a product comprising an insert having an edge which is to be reinforced and a plastic body which is injection-moulded onto the edge, wherein the plastic body surrounds an edge region of the insert on both sides and at the end face. The injection mould comprises at least one first mould part and at least one second mould part. The first mould part forms a first peripheral cavity into which the insert having the edge region to be overmoulded can be inserted, so that the outer side of the edge region bears against a wall of the first cavity. The first peripheral cavity has a rib for creating a recess in the first peripheral plastic body part. The second mould part is designed in such a manner that the cup-shaped insert having the first peripheral plastic body part can be inserted into the second mould part and that a second peripheral cavity for manufacturing the second peripheral plastic body part is formed on the outer side on the edge region to be overmoulded, wherein the recess in the first peripheral plastic body part is connected to the second peripheral cavity.

In a few embodiments of the injection mould, the rib can be arranged in a region in which two flow fronts of the first polymer melt meet.

In a few embodiments of the injection mould, the first cavity can have a plurality of injection points and a plurality of ribs, wherein the plurality of injection points are arranged uniformly along the first cavity and the plurality of ribs are in each case arranged centrally between two injection points.

In a few embodiments of the injection mould, the injection point for the first polymer melt and the injection point for the second polymer melt can be located on the same side of the respective mould part.

BRIEF DESCRIPTION OF THE DRAWINGS

The invention shall be explained in more detail in the following with reference to exemplary embodiments in connection with the drawing(s). In the figures.

EMBODIMENTS OF THE INVENTION

Figure 4:
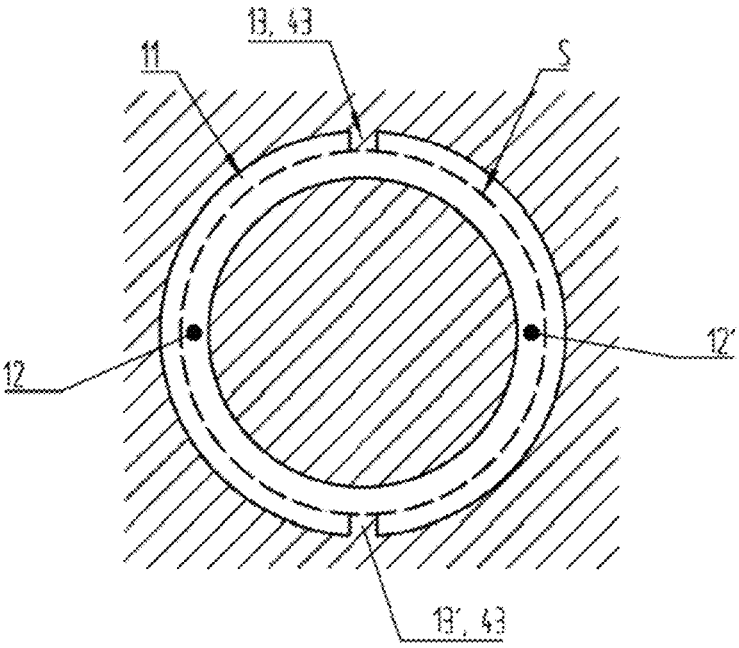
FIG. 4 shows a sectional illustration through the first mould part in the region of the first cavity.

FIG. 4 shows a sectional illustration through a section of a product made from a cup-shaped insert 3 having a peripheral edge which is to be reinforced and a peripheral plastic body 4 which is injection-moulded onto the edge. In this case, the plastic body 4 encloses an edge region 31 of the cup-shaped insert 3 on both sides and at the end face. The cup-shaped insert 3 typically has a base and a peripheral side wall. At the upper edge of the side wall, an outwardly directed edge (flange) similar to a flange is formed. The plastic body 4 is—as presented below—injected in a two-component method by means of two mould parts and is correspondingly manufactured from a first peripheral plastic body part 41 and a second peripheral plastic body part 42.

Figures 1A, 1B, 2A, 2B:
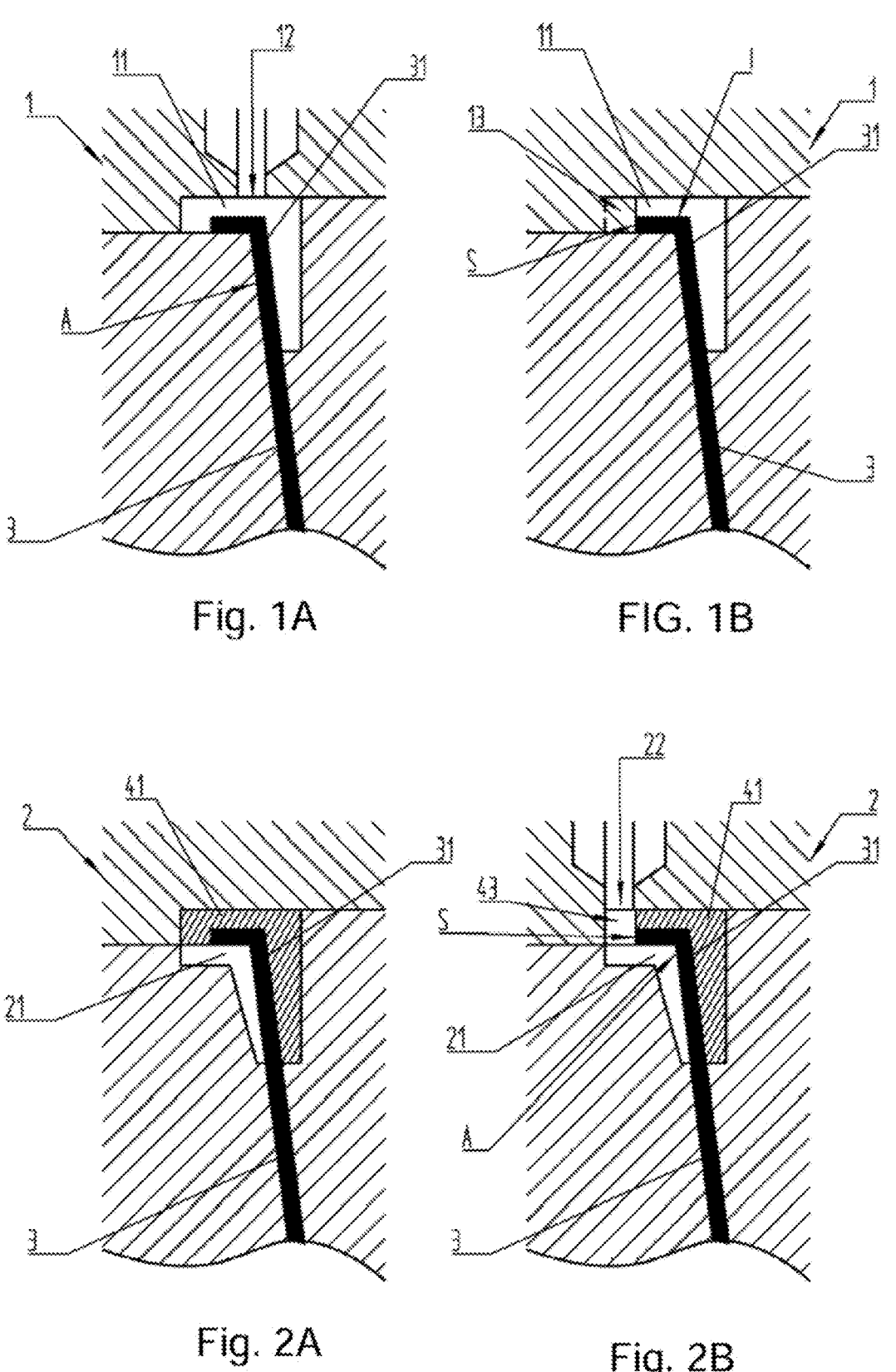
FIGS. 1A and 1B show a sectional illustration of a first mould part at (a) in the region of an injection point (FIG. 1A) and at (b) in the region of a rib (FIG. 1B)
FIGS. 2A and 2B show a sectional illustration of a second mould part at (a) in the region of the injection moulding of the first injection-moulded body part (FIG. 2A) and at (b) in the region of an injection point (FIG. 2B)
Figure 3:
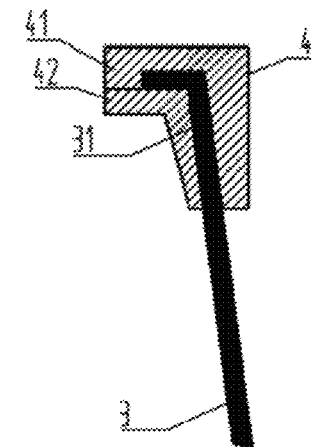
FIG. 3 shows a sectional illustration through a section of a product made from an insert and a plastic body moulded thereon.

FIGS. 1A and B show a sectional illustration of a detail of a first mould part 1 at (a) in the region of an injection point 12 for the first polymer melt (FIG. 1A) and at (b) in the region of a rib 13 (FIG. 1B). The first mould part 1 forms a first peripheral cavity 11, into which the edge region 31 of the insert 3, which is to be overmoulded, can be inserted. In this case, the outer side A of the insert 3 rests on a wall of the first cavity 11. The inner side I of the insert 3 is orientated towards the first cavity 11.

The cavity 1 has at least one injection point 12 for the first polymer melt for manufacturing the first peripheral plastic body part 41. This first peripheral plastic body part 41 forms a part of the plastic body and is arranged on the inner side I of the insert. When the first polymer melt is injected, this polymer melt distributes itself in the first peripheral cavity 11. In a region of the first peripheral cavity 11 in which the flow fronts of the first polymer melt meet, a rib 13 is formed inside the first cavity 11 (cf. FIG. 1B). This rib 13 is arranged in such a manner that an end face S of the edge region 31 of the insert adjoins the rib 13. The rib 13 forms a recess 43 in the first plastic body part 41, the function of which is explained below under FIG. 2B.

FIGS. 2A and 2B show a sectional illustration of a detail of a second mould part 2 at (a) in the region of the injection moulding of the first injection-moulded body part 41 (FIG. 2A) and at (b) in the region of an injection point of a second peripheral cavity 21 (FIG. 2B). The second mould part 2 forms the second peripheral cavity 21 for manufacturing the second peripheral plastic body part 42. The second cavity 21 is designed in such a manner that the insert 3 having the first plastic body part 41 injection-moulded thereon can be accommodated therein and the free second cavity 21 is formed on the outer side. The insert having the first plastic body part 41 is orientated in such a manner in this case that an injection point 22 of the second mould part 2 comes to lie in the recess 43 of the first plastic body part 41. The second polymer melt is injected through the recess 43 in this case and thus fills the second cavity 21 at the outer side A of the insert 3.

FIG. 4 shows a sectional illustration through the first mould part 1 in the region of the first cavity 11. In the embodiment shown, the first mould part 1 is provided with two injection points 12, 12' which are arranged at diametrically opposite points. Furthermore, the first cavity 11 has two ribs 13, 13' which are in each case arranged between the two injection points 12, 12' and in each case form a recess 43 in the first plastic body part 41. The dashed line indicates the end face of the insert 3.

LIST OF REFERENCE NUMBERS

1 First mould part
11 First peripheral cavity
12, 12' Injection point for the first polymer melt
13, 13' Rib
2 Second mould part
21 Second peripheral cavity
22 Injection point for the second polymer melt
3 Cup-shaped insert
31 Edge, edge region
4 Plastic body
41 First peripheral plastic body part
42 Second peripheral plastic body part
43 Recess
A Outer side of the edge region
I Inner side of the edge region
S End face of the edge region

The invention claimed is:

1. A method for producing a product comprising a cup-shaped insert having a peripheral edge which is to be reinforced and a peripheral plastic body which is injection-moulded onto the peripheral edge, the peripheral plastic body surrounding an edge region of the cup-shaped insert on both sides of the edge region and at an end face of the edge region, the method comprising:

providing a first mould part of an injection mould;

inserting the cup-shaped insert into the first mould part, the first mould part and the cup-shaped insert being designed in such a manner that a first peripheral cavity is formed on the inner side and at the end face at the edge region which is to be overmoulded and the outer side of the edge region of the cup-shaped insert bears against a wall of the first peripheral cavity;

injecting a first polymer melt into the first peripheral cavity to manufacture a first peripheral plastic body part, the first peripheral cavity having a rib which forms a recess in the first peripheral plastic body part at the end face of the edge region of the cup-shaped insert;

providing a second mould part of an injection mould;

inserting the cup-shaped insert having the first peripheral plastic body part into the second mould part, the second mould part being designed in such a manner that a second peripheral cavity for manufacturing a second peripheral plastic body part is formed on the outer side on the edge region to be overmoulded and that the recess in the first peripheral plastic body part is connected to the second peripheral cavity;

injecting a second polymer melt into the second mould part so that the second polymer melt flows through the recess of the first plastic body part, fills the second peripheral cavity and thus forms the second peripheral plastic body part;

removing the product having a peripheral plastic body consisting of the first and the second peripheral plastic body parts from the mould.

2. The method according to claim 1, wherein the first and second peripheral cavities in each case have at least one injection point for the first or second polymer melt.

3. The method according to claim 2, wherein the cup-shaped insert having the first plastic body part is inserted into the second mould part in such a manner that the recess is located at the at least one injection point for the second polymer melt.

4. The method according to claim 2, wherein the at least one injection point for the first polymer melt and the at least one injection point for the second polymer melt are located on the same side of the respective mould part.

5. The method according to claim 1, wherein the rib is arranged in a region in which two flow fronts of the first polymer melt meet.

6. The method according to claim 1, wherein the first peripheral cavity has a plurality of injection points and a plurality of ribs, wherein the plurality of injection points are arranged uniformly along the first peripheral cavity and the plurality of ribs are in each case arranged centrally between two injection points.

7. The method according to claim 1, wherein the product is a container, wherein the cup-shaped insert forms a container body or a container wall and the peripheral plastic body forms a peripheral collar having an outwardly directed edge similar to a flange, an external thread or latching means for a container lid.

8. An injection mould for the method according to claim 1, the injection mould comprising at least one first mould part and at least one second mould part, the first mould part forming a first peripheral cavity into which the cup-shaped insert having the edge region to be overmoulded can be inserted, so that the outer side of the edge region bears against a wall of the first peripheral cavity; the first peripheral cavity having a rib for creating a recess in the first peripheral plastic body part; and the second mould part being designed in such a manner that the cup-shaped insert having the first peripheral plastic body part can be inserted into the second mould part and that a second peripheral cavity for manufacturing the second peripheral plastic body part is formed on the outer side on the edge region to be overmoulded, the recess in the first peripheral plastic body part being connected to the second peripheral cavity.

9. The injection mould according to claim 8, wherein the first peripheral cavity has a plurality of injection points and a plurality of ribs, wherein the plurality of injection points are arranged uniformly along the first cavity and the plurality of ribs are in each case arranged centrally between two injection points.

10. The injection mould according to claim 8, wherein an injection point for the first polymer melt and an injection point for the second polymer melt are located on the same side of the respective mould part.

\* \* \* \* \*